(12) United States Patent
Chen

(10) Patent No.: US 9,270,172 B2
(45) Date of Patent: Feb. 23, 2016

(54) DC-DC CONVERTER, TIMING SIGNAL GENERATING CIRCUIT, AND OPERATING METHOD THEREOF

(71) Applicant: uPI semiconductor corp., Zhubei, Hsinchu County (TW)

(72) Inventor: Wei-Ling Chen, Zhubei (TW)

(73) Assignee: UPI SEMICONDUCTOR CORPORATION, Zhubei, Hsinchu County (TW)

( * ) Notice: Subject to any disclaimer, the term of this patent is extended or adjusted under 35 U.S.C. 154(b) by 0 days.

(21) Appl. No.: 14/102,574

(22) Filed: Dec. 11, 2013

(65) Prior Publication Data

US 2014/0167716 A1 Jun. 19, 2014

(30) Foreign Application Priority Data

Dec. 17, 2012 (TW) .............................. 101147786 A

(51) Int. Cl.
*H02M 3/156* (2006.01)

(52) U.S. Cl.
CPC ..................................... *H02M 3/156* (2013.01)

(58) Field of Classification Search
CPC ......................... H02M 2001/0032; G05F 1/10
USPC .......... 323/222–225, 234, 268–277, 280–290
See application file for complete search history.

(56) References Cited

U.S. PATENT DOCUMENTS

| | | | | |
|---|---|---|---|---|
| 6,124,740 A * | 9/2000 | Klemmer | ............. | H03K 17/662 326/83 |
| 6,809,590 B1 * | 10/2004 | Wong | ...................... | H03F 3/345 330/265 |
| 7,671,573 B1 * | 3/2010 | Ling | ...................... | H02M 3/156 323/283 |
| 7,714,547 B2 * | 5/2010 | Fogg | ......................... | H03K 4/50 323/224 |
| 7,965,070 B2 * | 6/2011 | Nakahashi | ............ | H02M 3/156 323/282 |
| 8,421,431 B2 * | 4/2013 | Chia | ........................ | H03K 7/08 323/288 |

(Continued)

FOREIGN PATENT DOCUMENTS

| TW | M414763 | 10/2011 |
|---|---|---|
| TW | 201206032 | 2/2012 |

OTHER PUBLICATIONS

English translation of abstract of TW M414763 (published Oct. 21, 2011).

(Continued)

*Primary Examiner* — Timothy J Dole
*Assistant Examiner* — Yusef Ahmed
(74) *Attorney, Agent, or Firm* — McClure, Qualey & Rodack, LLP

(57) ABSTRACT

A DC-DC converter including an output stage, a feedback loop, a pulse-width modulation (PWM) generating circuit, and a driving circuit is disclosed. The output stage is coupled to an input voltage and an output inductor to provide an output voltage. The feedback loop is coupled to the output inductor and receives the output voltage to generate a control signal. The PWM generating circuit is coupled to the feedback loop and receives the control signal. The PWM generating circuit also includes a timing signal generating unit which makes the PWM generating circuit to generate a PWM signal according to a correction voltage. The correction voltage is reacted in the output voltage and a first current source related to the input voltage. The driving circuit is coupled to the output stage and the PWM generating circuit and receives the PWM signal to control the operation of the output stage.

16 Claims, 7 Drawing Sheets

(56) References Cited

U.S. PATENT DOCUMENTS

| | | | |
|---|---|---|---|
| 8,487,593 B2 | 7/2013 | Laur et al. | |
| 8,552,706 B2* | 10/2013 | Wu | H02M 3/156 323/284 |
| 8,629,669 B2* | 1/2014 | Tournatory | H02M 3/156 323/271 |
| 8,710,815 B2* | 4/2014 | Feng | H02M 3/156 323/271 |
| 2004/0189375 A1* | 9/2004 | Lee | G05F 3/262 327/543 |
| 2006/0043943 A1* | 3/2006 | Huang | H02M 3/1584 323/222 |
| 2006/0061340 A1* | 3/2006 | Wang | H02M 3/156 323/267 |
| 2006/0238182 A1* | 10/2006 | Yoshino | H02M 3/1582 323/282 |
| 2007/0001655 A1* | 1/2007 | Schiff | H02M 3/158 323/246 |
| 2007/0075790 A1* | 4/2007 | Liao | H02M 3/156 331/36 C |
| 2008/0018314 A1* | 1/2008 | Sheng | H02M 3/157 323/285 |
| 2008/0074089 A1* | 3/2008 | Yu | H02M 3/156 323/222 |
| 2008/0231246 A1* | 9/2008 | Sugie | G11B 19/28 323/284 |
| 2008/0315853 A1* | 12/2008 | Capilla | H02M 3/1588 323/288 |
| 2009/0027027 A1* | 1/2009 | Lin | H02M 3/158 323/285 |
| 2009/0153114 A1* | 6/2009 | Huang | H02M 3/1584 323/282 |
| 2009/0174383 A1* | 7/2009 | Tsui | H02M 3/156 323/282 |
| 2009/0243580 A1* | 10/2009 | Chen | H02M 3/156 323/288 |
| 2009/0273325 A1* | 11/2009 | Nakahashi | H02M 3/156 323/282 |
| 2010/0194369 A1* | 8/2010 | Nagai | H02M 3/156 323/284 |
| 2010/0201336 A1* | 8/2010 | Chen | H02M 3/1588 323/285 |
| 2010/0327836 A1* | 12/2010 | Li | H02M 3/1588 323/283 |
| 2011/0001461 A1* | 1/2011 | Lu | H02J 7/0031 323/283 |
| 2011/0062932 A1* | 3/2011 | Hawkes | H02M 3/156 323/288 |
| 2011/0080104 A1* | 4/2011 | Gray | H05B 41/40 315/246 |
| 2011/0115450 A1* | 5/2011 | Pongratananukul | H02M 3/1584 323/271 |
| 2011/0148371 A1* | 6/2011 | Huang | H02M 3/156 323/271 |
| 2011/0156685 A1* | 6/2011 | Chen | H02M 3/156 323/284 |
| 2011/0181262 A1* | 7/2011 | Deguchi | H02M 3/156 323/284 |
| 2011/0221407 A1* | 9/2011 | Kato | H02M 3/156 323/271 |
| 2011/0260703 A1* | 10/2011 | Laur | H02M 3/1563 323/271 |
| 2011/0304308 A1* | 12/2011 | Wan | H02M 3/1588 323/288 |
| 2011/0316508 A1* | 12/2011 | Cheng | H02M 1/14 323/282 |
| 2012/0019218 A1* | 1/2012 | Fang | H02M 3/156 323/271 |
| 2012/0019219 A1* | 1/2012 | Fang | H02M 3/156 323/271 |
| 2012/0019225 A1* | 1/2012 | Tsai | H02M 3/156 323/284 |
| 2012/0038334 A1* | 2/2012 | Peng | H02M 3/1588 323/282 |
| 2012/0049826 A1* | 3/2012 | Hsu | H02M 3/1588 323/284 |
| 2012/0081094 A1* | 4/2012 | Luo | H02M 3/156 323/284 |
| 2012/0286750 A1* | 11/2012 | Xu | H02M 3/156 323/282 |
| 2012/0319669 A1* | 12/2012 | Chen | H02M 3/1582 323/283 |
| 2013/0002223 A1* | 1/2013 | Xi | H02M 3/158 323/284 |
| 2013/0027012 A1* | 1/2013 | Huang | H02M 3/156 323/283 |
| 2013/0038312 A1* | 2/2013 | Wang | H02M 3/1584 323/288 |
| 2013/0141069 A1* | 6/2013 | Li | G05F 1/575 323/283 |
| 2013/0335046 A1* | 12/2013 | Huang | H02M 3/156 323/282 |
| 2014/0239925 A1* | 8/2014 | Tanabe | H02M 3/1582 323/271 |
| 2014/0292299 A1* | 10/2014 | Yang et al. | 323/288 |

OTHER PUBLICATIONS

Taiwan Office Action dated Sep. 17, 2014.

* cited by examiner

FIG. 1 (PAIOR ART)

DC-DC CONVERTER, TIMING SIGNAL GENERATING CIRCUIT, AND OPERATING METHOD THEREOF

BACKGROUND OF THE INVENTION

1. Field of the Invention

The invention relates to a DC-DC converter; in particular, to a DC-DC converter, a timing signal generating circuit, and operating methods thereof.

2. Description of the Prior Art

Please refer to FIG. 1. FIG. 1 illustrates a functional block diagram of a one-shot timing generator of a conventional DC-DC converter. As shown in FIG. 1, the one-shot timing generator TG is used to output a pulse signal ONT_OUT to control a gate control unit and further control a gate driver to output a switch conducting signal to an output stage. However, in practical applications, the pulse width of the pulse signal ONT_OUT is not always equal to the pulse width of the switch conducting signal due to non-ideal factors such as signal propagation delay, driver delay, or other delay caused by parasitic capacitances. The on-time (Ton) will be affected by these non-ideal factors to generate an error time, and the proportion of the error time under different input voltages will be different; therefore, it will cause an error generated in the system operation frequency.

Please refer to FIG. 2. FIG. 2 illustrates a curve diagram of the on-time (Ton) varied with the reciprocal of the input voltage ($V_{IN}$). As shown in FIG. 2, the intercept 52.041 of the curve y=3532.8x+52.041 with the vertical axis y is the error time of the on-time (Ton) under the non-ideal condition. As shown in FIG. 3, the system operation frequency (f) will be affected by this error time, and the system operation frequency (f) under different input voltages ($V_N$) will be also different. Especially, when the input voltage is at high-level, the system operation frequency will become lower, and the normal system operation will be affected.

Therefore, the invention provides a DC-DC converter, a timing signal generating circuit, and operating methods thereof to solve the above-mentioned problems occurred in the prior arts.

SUMMARY OF THE INVENTION

A scope of the invention is to provide a DC-DC converter. In a preferred embodiment, the DC-DC converter is coupled to an input voltage and an output inductor. The DC-DC converter includes an output stage, a feedback loop, a pulse-width modulation (PWM) generating circuit, and a driving circuit. The output stage is coupled to the input voltage and the output inductor to provide an output voltage. The feedback loop is coupled to the output inductor and receives the output voltage to generate a control signal. The PWM generating circuit is coupled to the feedback loop and receives the control signal. The PWM generating circuit includes a timing signal generating unit making the PWM generating circuit to generate a PWM signal according to a correction voltage. The correction voltage responds the output voltage and a first current source related to the input voltage. The driving circuit is coupled to the output stage and the PWM generating circuit and receives the PWM signal to control the operation of the output stage.

Another scope of the invention is to provide a timing signal generating circuit. In a preferred embodiment, the timing signal generating circuit is applied in a PWM generating circuit of a DC-DC converter. The DC-DC converter is coupled to an input voltage to provide an output voltage. The timing signal generating circuit includes a timing signal generating unit. The timing signal generating unit includes a timing signal circuit, a correction circuit, and a comparator. The timing signal circuit is used for receiving a PWM control signal and generating a time control signal according to the PWM control signal and a first current source related to the input voltage. The correction circuit includes the first current source and a correction resistor and responds the input voltage and the output voltage to provide a correction voltage. The comparator is coupled to the timing signal circuit and the correction circuit and makes the PWM generating circuit to generate a PWM signal.

Another scope of the invention is to provide a DC-DC converter operating method. In a preferred embodiment, the DC-DC converter operating method is used to operate a DC-DC converter. The DC-DC converter includes an output stage, a feedback loop, a PWM generating circuit, and a driving circuit. The output stage is coupled to the input voltage and the output inductor. The feedback loop is coupled to the output inductor. The DC-DC converter operating method includes steps of: using the output stage to provide an output voltage; using the feedback loop to receive the output voltage and generate a control signal; using the PWM generating circuit to receive the control signal and generate a PWM signal according to a correction voltage, wherein the correction voltage responds the output voltage and a first current source related to the input voltage; and using the driving circuit to receive the PWM signal to control the operation of the output stage.

Another scope of the invention is to provide a timing signal generating circuit operating method. In a preferred embodiment, the timing signal generating circuit operating method is applied in a PWM generating circuit of a DC-DC converter. The DC-DC converter is coupled to an input voltage and provides an output voltage. The timing signal generating circuit includes a timing signal circuit, a correction circuit, and a comparator. The timing signal generating circuit operating method includes steps of: using the timing signal circuit to generate a time control signal according to the PWM control signal and a first current source related to the input voltage; using the correction circuit to respond the input voltage and the output voltage to provide a correction voltage; and using the comparator to receive the time control signal and the correction voltage and make the PWM generating circuit to generate a PWM signal.

Compared to the prior arts, the DC-DC converter, the timing signal generating circuit, and the operating methods thereof disclosed by the invention can minus the error time varied with the input voltage from the on-time to effectively reduce the non-ideal error time effect on the system operation frequency caused by the signal propagation delay, driver delay, or other delay caused by parasitic capacitances.

Therefore, constant on-time and operation frequency can be maintained instead of being varied with the input voltage to enhance the system static stability and improve the electromagnetic interference phenomenon.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

A preferred embodiment of the invention is a DC-DC converter. In fact, the DC-DC converter of the invention has constant on-time, and can be applied in power conversion circuit structures of the AC-DC converter or the DC-AC converter. It should be noticed that "coupled" in the invention can be various types of directly coupled, indirectly coupled, or electrically connected without limiting their connection relationship.

Figure 1:
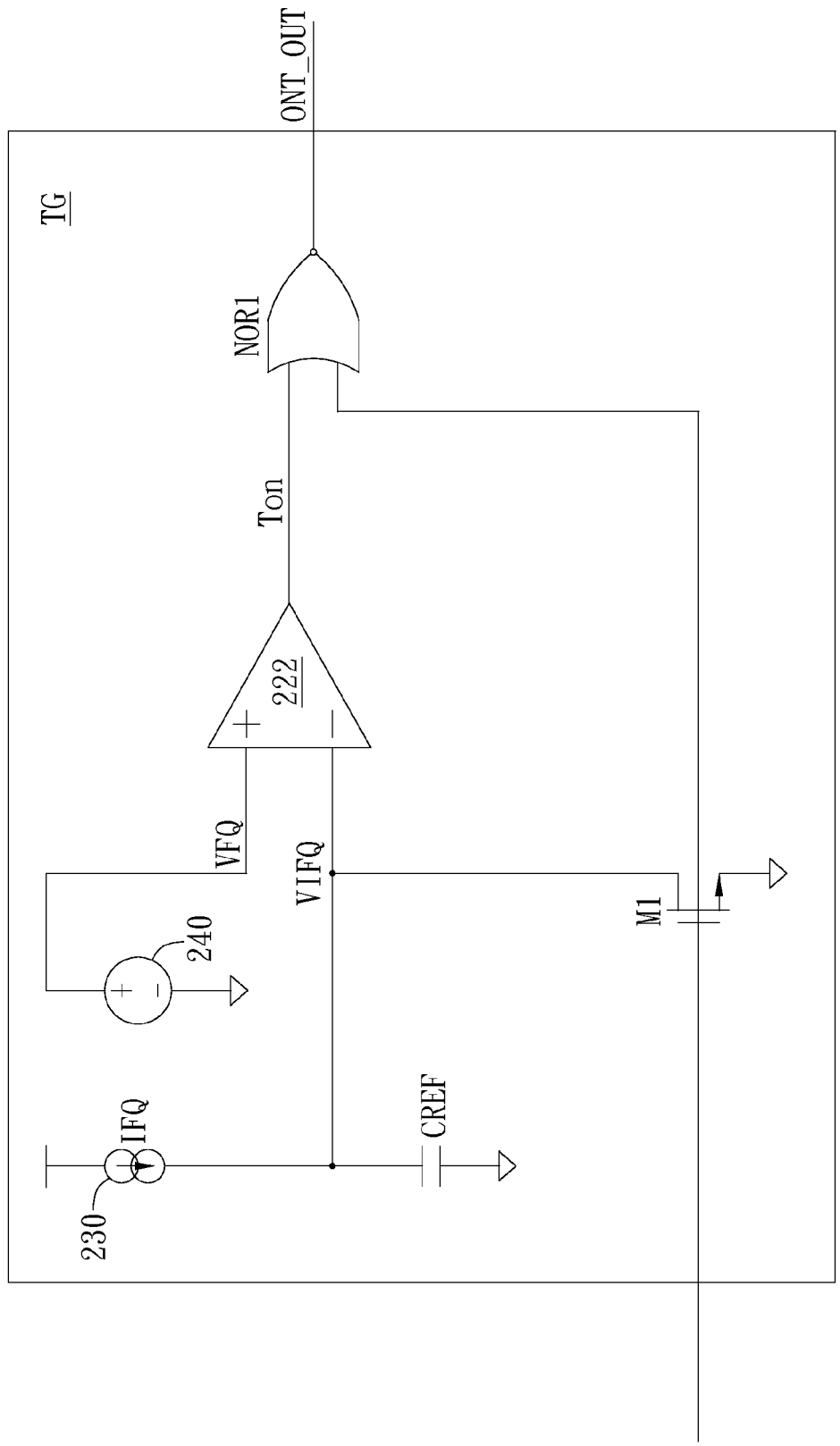
FIG. 1 illustrates a functional block diagram of a one-shot timing generator of a conventional DC-DC converter.
Figure 2:
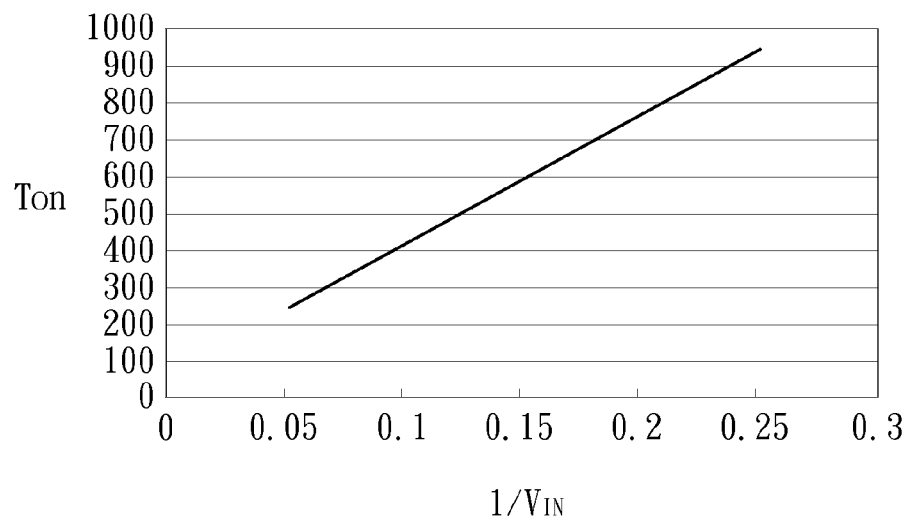
FIG. 2 illustrates a curve diagram of the on-time (Ton) varied with the reciprocal of the input voltage ($V_{IN}$).
Figure 3:
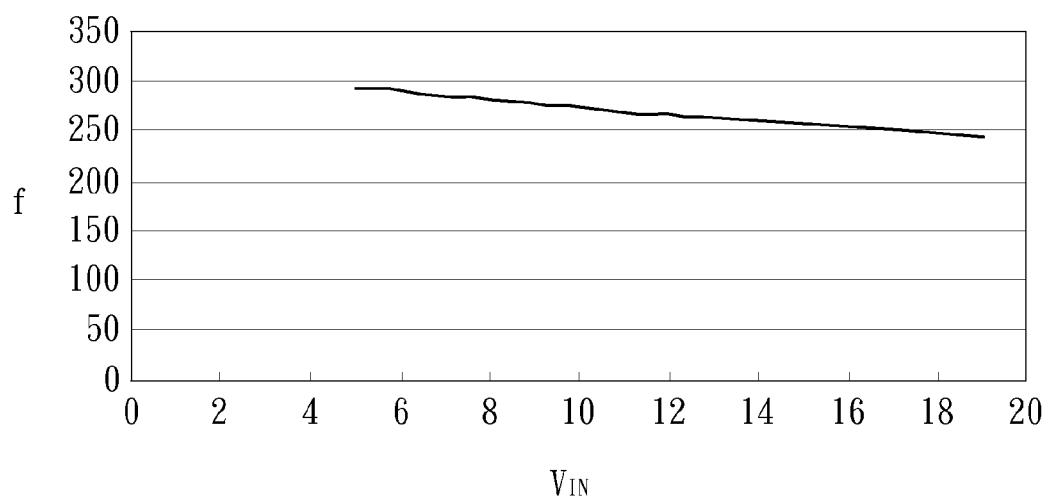
FIG. 3 illustrates different system operation frequencies under different input voltages.
Figure 4:
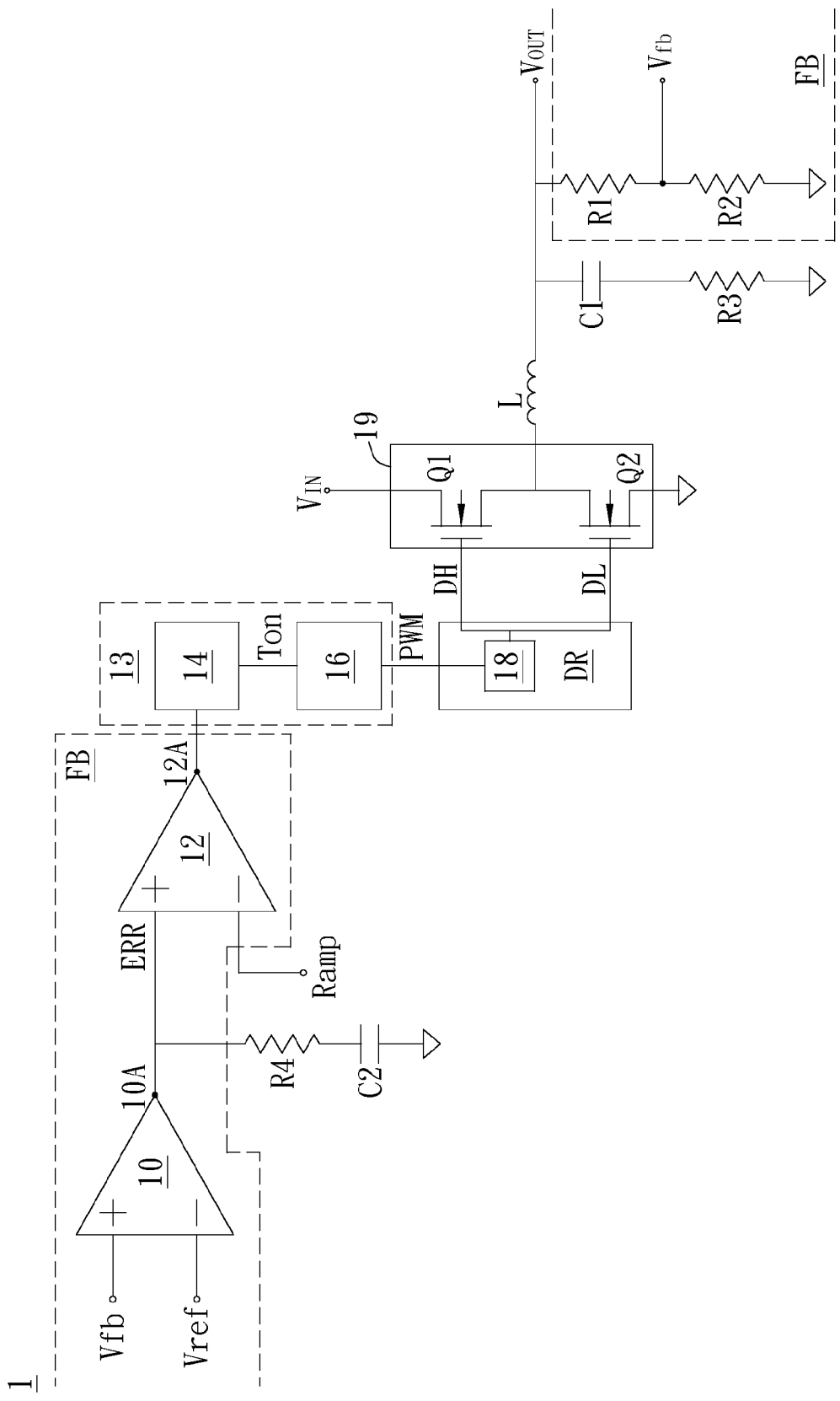
FIG. 4 illustrates a functional block diagram of the DC-DC converter in an embodiment of the invention.

Please refer to FIG. 4. The DC-DC converter 1 includes an error amplifier 10, a comparator 12, a timing signal generating unit 14, a gate control unit 16, a gate driver 18, an output stage 19, an output inductor L, a first voltage-dividing resistor R1, a second voltage-dividing resistor R2, resistors R3~R4, and capacitors C1~C2. The output stage 19 includes a first transistor Q1 and a second transistor Q2. A feedback loop FB includes the first voltage-dividing resistor R1, the second voltage-dividing resistor R2, the error amplifier 10, and the comparator 12. A pulse-width modulation (PWM) generating circuit 13 includes the timing signal generating unit 14 and the gate control unit 16. A driving circuit DR includes the gate driver 18.

The error amplifier 10 is coupled to the comparator 12; the resistor R4 is coupled between the error amplifier 10 and the comparator 12; the capacitor C2 is coupled between the resistor R4 and the ground terminal; the timing signal generating unit 14 is coupled between the comparator 12 and the gate control unit 16; the gate control unit 16 is coupled between the timing signal generating unit 14 and the gate driver 18; the gate driver 18 is coupled to the gates of the first transistor Q1 and the second transistor Q2 respectively; the first transistor Q1 and the second transistor Q2 are coupled in series between an input voltage $V_{IN}$ and the ground terminal; one end of the output inductor L is coupled between the first transistor Q1 and the second transistor Q2, and the other end of the output inductor L is coupled to the output voltage $V_{OUT}$; the capacitor C1 is coupled between the output inductor L and the output voltage $V_{OUT}$; the resistor R3 is coupled between the capacitor C1 and the ground terminal; the first voltage-dividing resistor R1 is coupled between the output inductor L and the output voltage $V_{OUT}$; the second voltage-dividing resistor R2 is coupled between the first voltage-dividing resistor R1 and the ground terminal A negative input terminal − of the error amplifier 10 is coupled between the first voltage-dividing resistor R1 and the second voltage-dividing resistor R2 to receive a feedback voltage Vfb; a positive input terminal + of the error amplifier 10 receives a reference voltage Vref; an output terminal 10A of the error amplifier 10 outputs an error amplifying signal ERR. A positive input terminal + of the comparator 12 receives the error amplifying signal ERR; a negative input terminal − of the comparator 12 receives a ramp signal Ramp; an output terminal 12A of the comparator 12 outputs a control signal to the timing signal generating unit 14.

The timing signal generating unit 14 is corrected according to the correction voltage to output a constant on-time signal Ton to the gate control unit 16. The gate control unit 16 outputs a pulse-width modulation signal PWM to the gate driver 18 according to the on-time signal Ton. The gate driver 18 controls the operation of the output stage 19 according to the pulse-width modulation signal PWM to selectively output switch conducting signals DH and DL to the gates of the first transistor Q1 and the second transistor Q2 to control the first transistor Q1 and the second transistor Q2 switched on or off.

Figure 5:
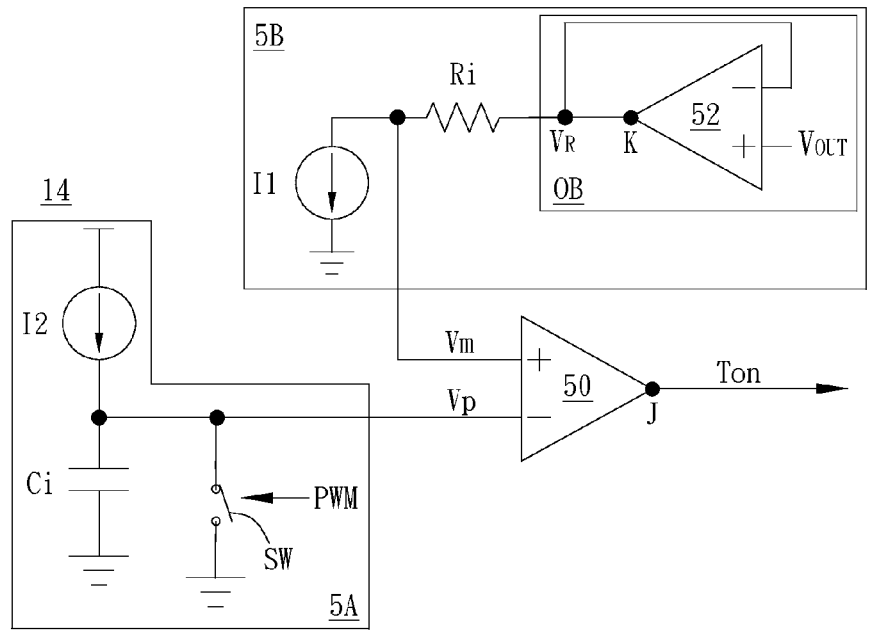
FIG. 5 illustrates a functional block diagram of the timing signal generating unit in an embodiment of the invention.

Next, the timing signal generating unit applied in the PWM generating circuit of the DC-DC converter will be introduced in detail as follows. As shown in FIG. 5, the timing signal generating unit 14 includes a timing signal circuit 5A, a correction circuit 5B, and a first comparator 50. In this embodiment, the timing signal circuit 5A includes a second current source I2, a capacitor Ci, and a switch SW; the correction circuit 5B includes a first current source I1, a correction resistor Ri, and an operational amplifier 52. In fact, the connecting way of the operational amplifier 52 can form an operational amplifier buffer OB as a buffer unit in the correction circuit 5B.

The capacitor Ci is coupled between the second current source I2 and the ground terminal; a positive input terminal + of the first comparator 50 is coupled between the correction resistor Ri and the first current source I1, and a negative input terminal − of the first comparator 50 is coupled among the second current source I2, the capacitor Ci, and the switch SW; the first current source I1 is coupled between the correction resistor Ri and the ground terminal; the correction resistor Ri is coupled between the operational amplifier 52 and the first current source I1; a positive input terminal + of the operational amplifier 52 is coupled to the output voltage $V_{OUT}$, and a negative input terminal − of the operational amplifier 52 is coupled between an output terminal K of the operational amplifier 52 and the correction resistor Ri.

It should be noticed that the first current source I1 and the second current source I2 are functions of the input voltage $V_{IN}$ respectively, that is to say, the currents of the first current source I1 and the second current source I2 will be varied with the changing of the input voltage $V_{IN}$.

The timing signal circuit 5A receives the pulse-width modulation signal PWM and generates a time control signal Vp according to the pulse-width modulation signal PWM and the second current source I2 related to the input voltage $V_{IN}$.

In the correction circuit 5B, the voltage $V_R$ between the output terminal K of the operational amplifier 52 and the correction resistor Ri is approximately near the output voltage $V_{OUT}$, and the voltage across the correction resistor Ri equals to the product of the first current source I1 and the correction resistor Ri. Therefore, the correction voltage Vm that the correction circuit 5B provides to the first comparator 50 is equal to the output voltage $V_{OUT}$ minus the product of the first current source I1 and the correction resistor Ri. That is to say, the correction voltage Vm=the output voltage $V_{OUT}$−(the first current source I1*the correction resistor Ri). Since the first current source I1 is a function of the input voltage $V_{IN}$, the correction voltage Vm provided by the correction circuit 5B is a function of the input voltage $V_{IN}$ and the output voltage $V_{OUT}$ to respond the input voltage $V_{IN}$ and the output voltage $V_{OUT}$ at the same time.

When the positive input terminal + of the first comparator 50 receives the correction voltage Vm from the correction circuit 5B and the negative input terminal − of the first comparator 50 receives the time control signal Vp from the timing signal circuit 5A, the first comparator 50 compares the time control signal Vp with the correction voltage Vm to generate the on-time signal Ton including the corrected on-time and output the on-time signal Ton through the output terminal J. It should be noticed that the corrected on-time equals to [the capacitor Ci*(the output voltage $V_{OUT}$−the first current source I1*the correction resistor Ri)]/the second current source I2, that is to say, the corrected on-time is equal to the uncorrected on-time minus the error time. Therefore, after the on-time is corrected, the effect of the error time on the on-time can be effectively reduced.

Figure 6:
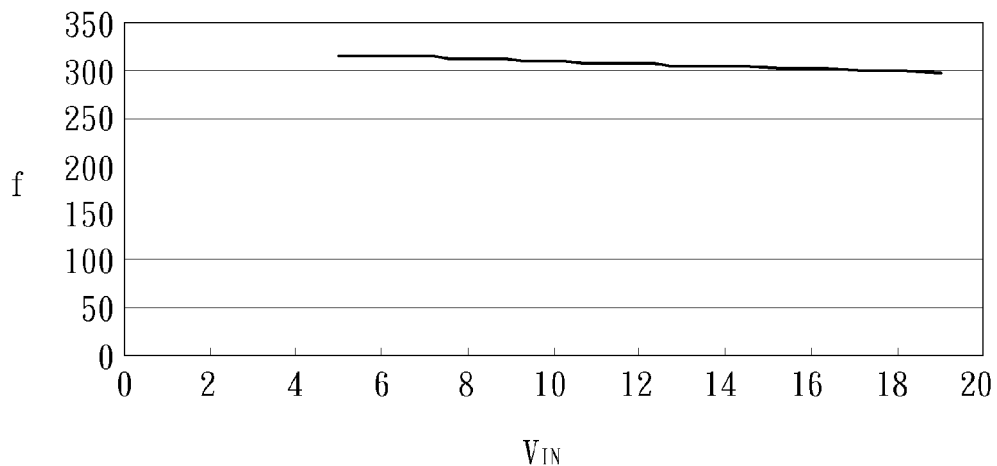
FIG. 6 illustrates a schematic diagram of the corrected operation frequency not varied with the input voltage.

The corrected result is shown in FIG. 6. As shown in FIG. 6, the corrected operation frequency will be stable without being varied with the different input voltages $V_N$. It should be noticed that the first current source I1 becomes larger with the increasing of the input voltages $V_N$. Therefore, when the input voltages $V_{IN}$ becomes larger, the on-time minus larger error time, namely the degree that the on-time is corrected also becomes larger.

Figure 7:
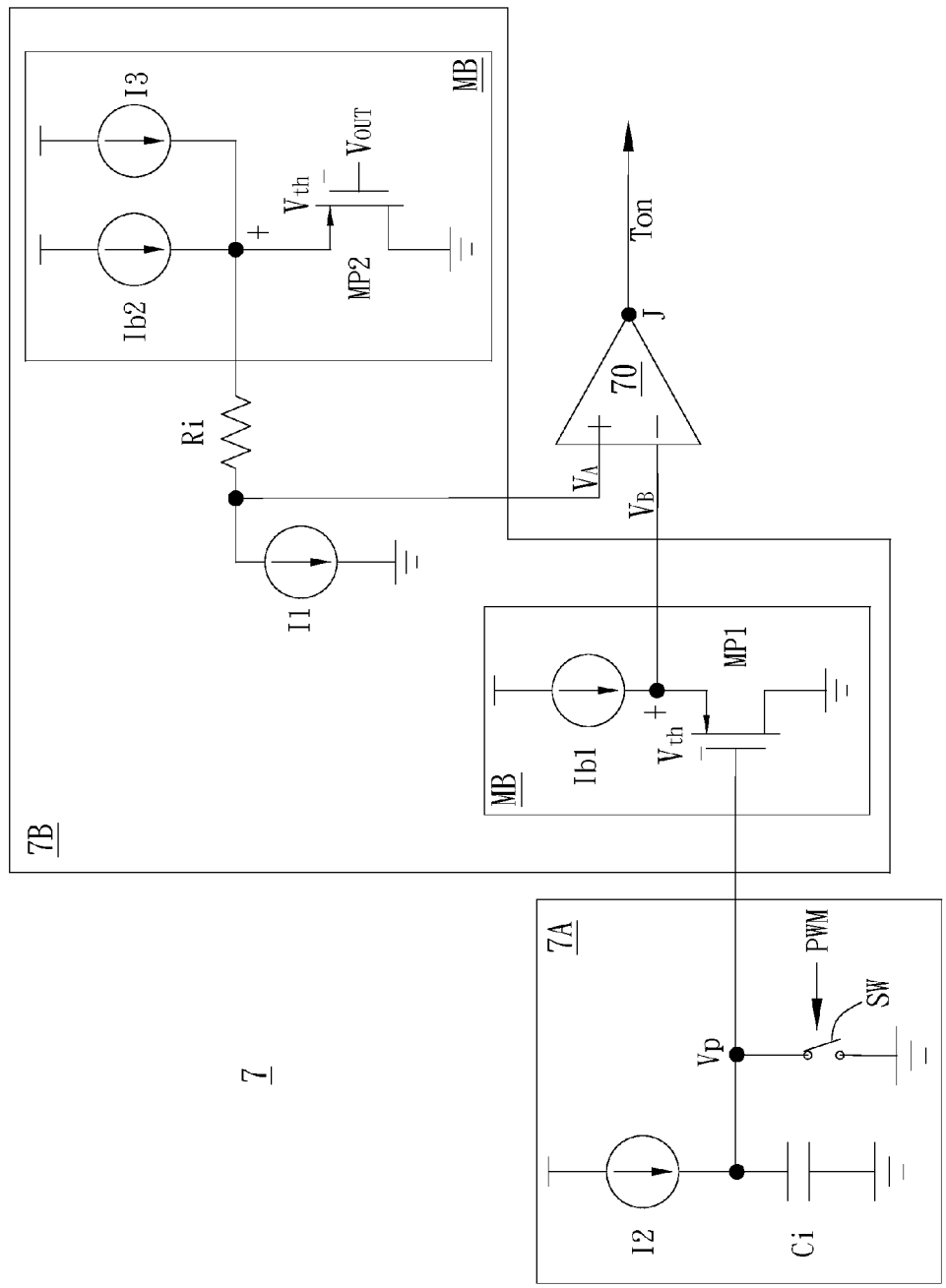
FIG. 7 illustrates a functional block diagram of the timing signal generating circuit in another embodiment of the invention.

Please refer to FIG. 7. FIG. 7 illustrates a functional block diagram of the timing signal generating circuit in another embodiment of the invention. As shown in FIG. 7, the timing signal generating circuit 7 includes a timing signal circuit 7A, a correction circuit 7B, and a first comparator 70. In this embodiment, the timing signal circuit 7A includes a second current source I2, a capacitor Ci, and a switch SW; the correction circuit 7B includes a first current source I1, a correction resistor Ri, and a buffer unit MB. The buffer unit MB includes a third current source I3, a second bias current source Ib2, a second transistor MP2, a first bias current source Ib1, and a first transistor MP1.

The capacitor Ci is coupled between the second current source I2 and the ground terminal; a gate of the first transistor MP1 is coupled between the second current source I2 and the capacitor Ci, and a source and a drain of the first transistor MP1 are coupled to the first bias current source Ib1 and the ground terminal respectively; a positive input terminal + of the first comparator 70 is coupled between the correction resistor Ri and the first current source I1, a negative input terminal − of the first comparator 70 is coupled between the first bias current source Ib1 and the first transistor MP1; the first current source I1 is coupled between the correction resistor Ri and the ground terminal; one end of the correction resistor Ri is coupled to the first current source I1 and the positive input terminal + of the first comparator 70, and the other end of the correction resistor Ri is coupled to the second transistor MP2, the second bias current source Ib2, and the third current source I3; a gate of the second transistor MP2 is coupled to the output voltage $V_{OUT}$, and a source and a drain of the second transistor MP2 are coupled to the ground terminal, the second bias current source Ib2, and the third current source I3 respectively.

It should be noticed that the first current source I1, the second current source I2, and the third current source I3 are functions of the input voltage $V_{IN}$ respectively; that is to say, the currents of the first current source I1, the second current source I2, and the third current source I3 are varied with the changing of the input voltage $V_{IN}$.

In addition, the current value of the first current source I1 is equal to the current value of the third current source I3 to maintain the common mode level of the second transistor MP2.

The timing signal circuit 7A receives the pulse-width modulation signal PWM and generates a time control signal Vp to a gate of the first transistor MP1 according to the pulse-width modulation signal PWM and the second current source I2 related to the input voltage $V_{IN}$. A voltage $V_B$ between the first bias current source Ib1 and the first transistor MP1 is equal to the sum of a threshold voltage Vth of the first transistor MP1 and the time control signal Vp. A correction voltage $V_A$ between the correction resistor Ri and the first current source I1 is equal to the output voltage $V_{OUT}$ plus the threshold voltage Vth of the second transistor MP2 and then minus the product of the first current source I1 and the correction resistor Ri. That is to say, the correction voltage $V_A$=the output voltage $V_{OUT}$+the threshold voltage Vth of the second transistor MP2−(the first current source I1*the correction resistor Ri). Since the first current source I1 is a function of the input voltage $V_N$, the correction voltage $V_A$ provided by the correction circuit 5B is a function of the input voltage VIN and the output voltage $V_{OUT}$ to respond the input voltage $V_N$ and the output voltage $V_{OUT}$ at the same time.

When the positive input terminal + of the first comparator 70 receives the correction voltage $V_A$ and the negative input terminal − of the first comparator 70 receives the voltage $V_B$, the first comparator 70 compares the voltage $V_B$ with the correction voltage $V_A$ to generate the on-time signal Ton including the corrected on-time and output the on-time signal Ton through the output terminal J.

In fact, the first transistor MP1 and the second transistor MP2 in the buffer unit MB of the correction circuit 7B can be MOSFETs, and the buffer unit MB can be MOSFET buffer, but not limited to this.

Figure 8:
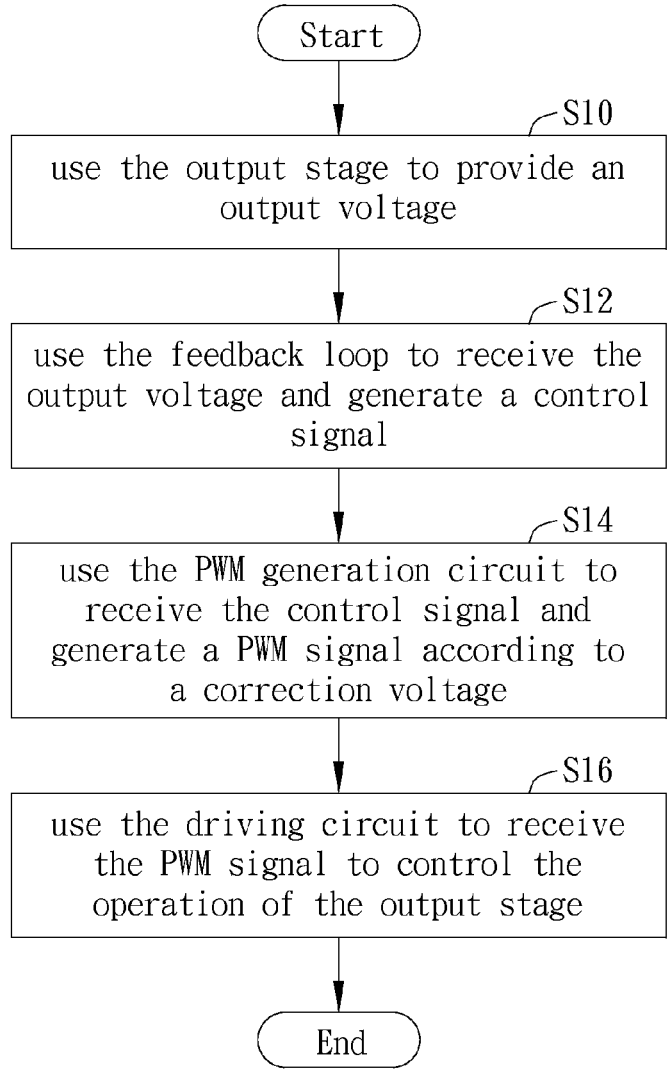
FIG. 8 illustrates a flowchart of the DC-DC converter operating method in another embodiment of the invention.

Another preferred embodiment of the invention is a DC-DC converter operating method. In this embodiment, the DC-DC converter operating method is used to operate a DC-DC converter having a constant on-time. The DC-DC converter includes an output stage, a feedback loop, a PWM generating circuit, and a driving circuit. The output stage is coupled to the input voltage and the output inductor. The feedback loop is coupled to the output inductor. Please refer to FIG. 8. FIG. 8 illustrates a flowchart of the DC-DC converter operating method in this embodiment.

As shown in FIG. 8, at first, in the step S10, the method uses the output stage to provide an output voltage. Then, in the step S12, the method uses the feedback loop to receive the output voltage and generate a control signal. Next, in the step S14, the method uses the PWM generating circuit to receive the control signal and generate a PWM signal according to a correction voltage, wherein the correction voltage responds the output voltage and a first current source related to the input voltage. Afterwards, in the step S16, the method uses the driving circuit to receive the PWM signal to control the operation of the output stage.

It should be noticed that there are two ways for the method to perform the step S14 as follows. (1) If the timing signal generating unit of the PWM generating circuit includes a correction resistor, then the correction voltage used in the step S14 is equal to the output voltage minus the product of the first current source and the correction resistor. (2) If the timing signal generating unit of the PWM generating circuit includes a correction resistor and a MOSFET buffer, then the correction voltage used in the step S14 is equal to the output voltage plus the threshold voltage of the MOSFET buffer and then minus the product of the first current source and the correction resistor.

Figure 9:
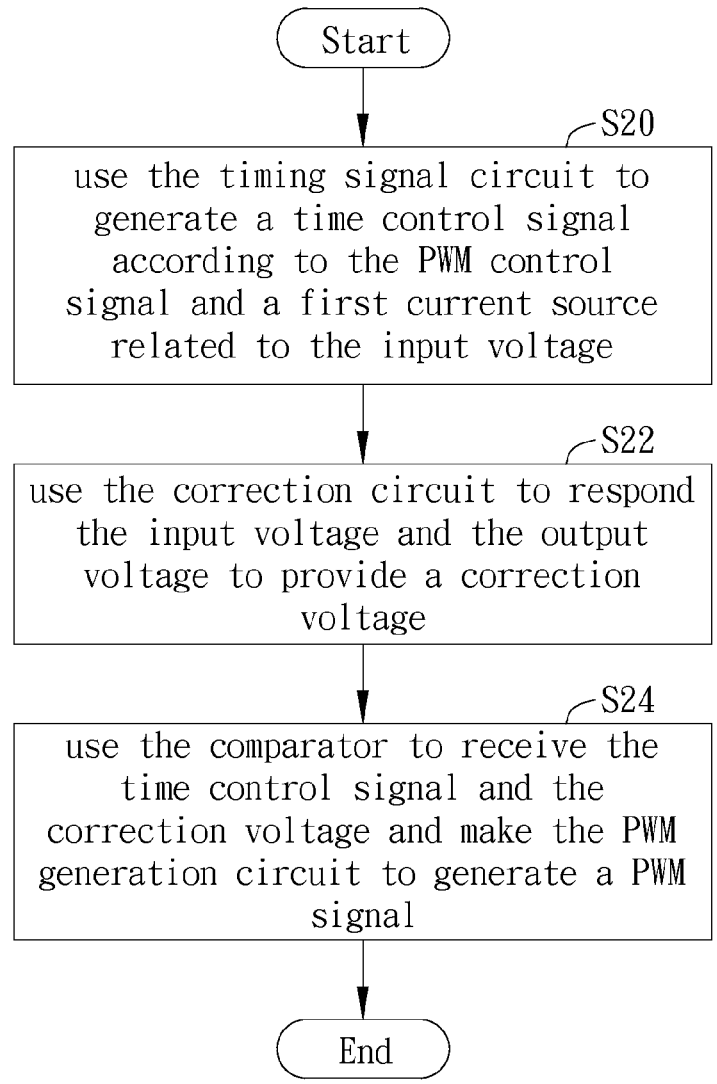
FIG. 9 illustrates a flowchart of the timing signal generating circuit operating method in another embodiment of the invention.

Another preferred embodiment of the invention is a timing signal generating circuit operating method. In this embodiment, the timing signal generating circuit operating method is applied in a PWM generating circuit of a DC-DC converter. The DC-DC converter is coupled to an input voltage and provides an output voltage. The timing signal generating circuit includes a timing signal circuit, a correction circuit, and a comparator. Please refer to FIG. 9. FIG. 9 illustrates a flowchart of the timing signal generating circuit operating method in this embodiment.

As shown in FIG. 9, at first, in the step S20, the method uses the timing signal circuit to generate a time control signal according to the PWM control signal and a first current source related to the input voltage. Then, in the step S22, the method uses the correction circuit to respond the input voltage and the output voltage to provide a correction voltage. Afterwards, in the step S24, the method uses the comparator to receive the time control signal and the correction voltage and make the PWM generating circuit to generate a PWM signal.

In practical applications, the method can provide an operational amplifier buffer or a MOSFET buffer as a buffer unit in the correction circuit, but not limited to this.

Compared to the prior arts, the DC-DC converter, the timing signal generating circuit, and the operating methods thereof disclosed by the invention can minus the error time varied with the input voltage from the on-time to effectively reduce the non-ideal error time effect on the system operation frequency caused by the signal propagation delay, driver delay, or other delay caused by parasitic capacitances. Therefore, constant on-time and operation frequency can be maintained instead of being varied with the input voltage to enhance the system static stability and improve the electromagnetic interference phenomenon.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A DC-DC converter, coupled to an input voltage and an output inductor, the DC-DC converter comprising:
   an output stage, coupled to the input voltage and the output inductor and providing an output voltage;
   a feedback loop, coupled to the output inductor and receiving the output voltage to generate a control signal;
   a pulse-width modulation (PWM) generating circuit, coupled to the feedback loop and receiving the control signal, wherein the PWM generating circuit comprises a timing signal generating unit, the timing signal generating unit generates an on-time signal according to a correction voltage of the timing signal generating unit and the PWM generating circuit generates a PWM signal according to the on-time signal, and the correction voltage responds the output voltage and a first current source of the timing signal generating unit, and the first current source is a function of the input voltage, and the first current source is varied with a changing of the input voltage; and
   a driving circuit, coupled to the output stage and the PWM generating circuit and receiving the PWM signal to control the operation of the output stage, wherein the timing signal generating unit comprises:
   a first comparator having a first input terminal and a second input terminal;
   a correction circuit comprising the first current source and a correction resistor, wherein the first input terminal of the first comparator is coupled between the first current source and the correction resistor, wherein the correction circuit further comprises a first buffer unit coupled between a terminal of the correction resistor and the output voltage; and
   a timing signal circuit comprising a second current source, a switch, and a capacitor, wherein the timing signal circuit is coupled to the second input terminal of the first comparator.

2. The DC-DC converter of claim 1, wherein the correction voltage equals to the output voltage minus the product of the first current source and the correction resistor.

3. The DC-DC converter of claim 1, wherein the timing signal generating unit further comprises a metal-oxide-semiconductor field-effect transistor (MOSFET) buffer, the correction voltage equals to the output voltage plus a threshold voltage of the MOSFET buffer and then minus the product of the first current source and the correction resistor.

4. The timing signal generating circuit of claim 1, wherein the first buffer unit has a first buffer input terminal, a second buffer input terminal, and a buffer output terminal, the first buffer input terminal is coupled to the buffer output terminal and the second buffer input terminal is coupled to the output voltage.

5. The timing signal generating circuit of claim 1, wherein the first buffer unit has a third current source, a second bias current source, and a second switch, the terminal of the correction resistor is coupled to the third current source, the second bias current source, and the second switch, and the second switch is coupled to the output voltage.

6. The timing signal generating circuit of claim 1, wherein the correction circuit further comprises a second buffer unit coupled between the timing signal circuit and the second input terminal of the first comparator.

7. The timing signal generating circuit of claim 6, wherein the second buffer unit comprises a first bias current and a first switch, the second input terminal of the first comparator is coupled between the first bias current and the first switch, and the timing signal circuit is coupled to the first switch.

8. A timing signal generating circuit, applied in a PWM generating circuit of a DC-DC converter, the DC-DC converter coupling to an input voltage and providing an output voltage, the timing signal generating circuit comprising:
   a first comparator having a first input terminal and a second input terminal, the first comparator generating an on-time signal according to a correction voltage of the timing signal generating circuit and the PWM generating circuit generating a PWM signal according to the on-time signal;
   a correction circuit comprising a first current source, a correction resistor, and a first buffer unit, the correction circuit responding the first current source and the output voltage to provide the correction voltage of the timing signal generating circuit, wherein the first input terminal of the first comparator is coupled between the first current source and the correction resistor, and the correction resistor is coupled to the first buffer unit; and
   a timing signal circuit comprising a second current source, a switch, and a capacitor, the timing signal circuit receiving a PWM control signal and generating a time control signal according to the PWM control signal and the first current source, wherein the first current source is a function of the input voltage, and the first current source is varied with a changing of the input voltage, the timing signal circuit is coupled to the second input terminal of the first comparator.

9. The timing signal generating circuit of claim 8, wherein the first buffer unit is coupled between a terminal of the correction resistor and the output voltage.

10. The timing signal generating circuit of claim 9, wherein the first buffer unit has a first buffer input terminal, a second buffer input terminal, and a buffer output terminal, the first buffer input terminal is coupled to the buffer output terminal and the second buffer input terminal is coupled to the output voltage.

11. The timing signal generating circuit of claim 9, wherein the first buffer unit has a third current source, a second bias current source, and a second switch, the terminal of the correction resistor is coupled to the third current source, the second bias current source, and the second switch, and the second switch is coupled to the output voltage.

12. The timing signal generating circuit of claim 9, wherein the correction circuit further comprises a second buffer unit coupled between the timing signal circuit and the second input terminal of the first comparator.

13. The timing signal generating circuit of claim 12, wherein the second buffer unit comprises a first bias current and a first switch, the second input terminal of the first comparator is coupled between the first bias current and the first switch, and the timing signal circuit is coupled to the first switch.

14. An operating method for a DC-DC converter, the DC-DC converter comprising an output stage, a feedback loop, a PWM generating circuit, and a driving circuit, the output stage being coupled to an input voltage and an output inductor, the feedback loop being coupled to the output inductor, the PWM generating circuit comprising a timing signal generating unit, the operating method comprising steps of:

using the output stage to provide an output voltage;
using the feedback loop to receive the output voltage and generate a control signal;
using the PWM generating circuit to receive the control signal and using the timing signal generating unit to generate an on-time signal according to a correction voltage of the timing signal generating unit and using the PWM generating circuit to generate a PWM signal according to the on-time signal, wherein the correction voltage responds the output voltage and a first current source of the timing signal generating unit, and the first current source is a function of the input voltage, and the first current source is varied with a changing of the input voltage; and
using the driving circuit to receive the PWM signal to control the operation of the output stage, wherein the timing signal generating unit of the PWM generating circuit comprises:

a first comparator having a first input terminal and a second input terminal;
a correction circuit comprising the first current source and a correction resistor, wherein the first input terminal of the first comparator is coupled between the first current source and the correction resistor, wherein the correction circuit further comprises a buffer unit coupled between a terminal of the correction resistor and the output voltage; and
a timing signal circuit comprising a second current source, a switch, and a-capacitor, wherein the timing signal circuit is coupled to the second input terminal of the first comparator.

15. An operating method for a timing signal generating circuit applied in a PWM generating circuit of a DC-DC converter, the DC-DC converter coupling to an input voltage and providing an output voltage, the timing signal generating circuit comprising a timing signal circuit, a correction circuit, and a first comparator, the first comparator having a first input terminal and a second input terminal, the correction circuit comprising a first current source, a correction resistor, and a buffer unit, the first input terminal of the first comparator being coupled between the first current source and the correction resistor, and the correction resistor being coupled to the buffer unit, the timing signal circuit comprising a second current source, a switch, and a capacitor, the timing signal circuit is coupled to the second input terminal of the first comparator, the operating method comprising steps of:

using the timing signal circuit to generate a time control signal according to the PWM control signal and the first current source, wherein the first current source is a function of the input voltage, and the first current source is varied with a changing of the input voltage;
using the correction circuit to respond the first current source and the output voltage to provide a correction voltage of the timing signal generating circuit; and using the first comparator to generate an on-time signal according to the correction voltage of the timing signal generating circuit and using the PWM generating circuit to generate a PWM signal according to the on-time signal.

16. The operating method of claim 15, wherein the buffer unit is coupled between a terminal of the correction resistor and the output voltage.

* * * * *